July 31, 1934.  H. T. R. HANITZ  1,968,520
CONTROL FOR CHANGE SPEED MECHANISMS
Filed Oct. 17, 1930   5 Sheets-Sheet 1
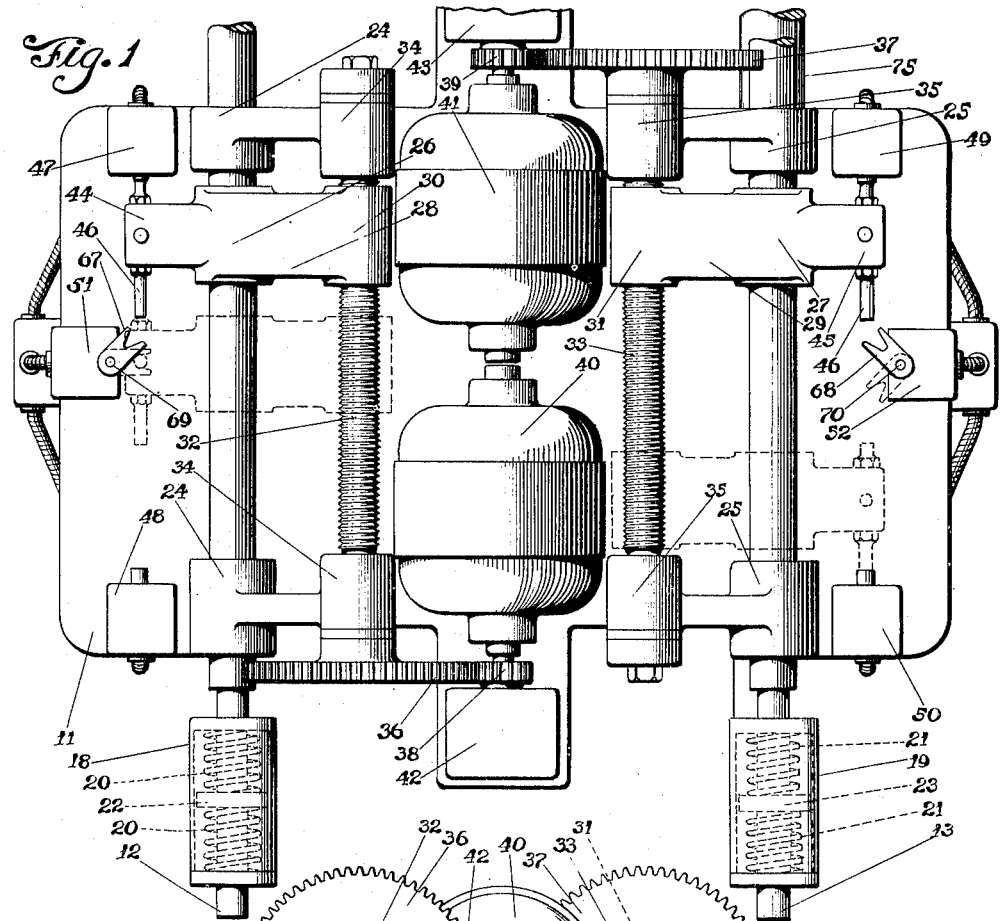
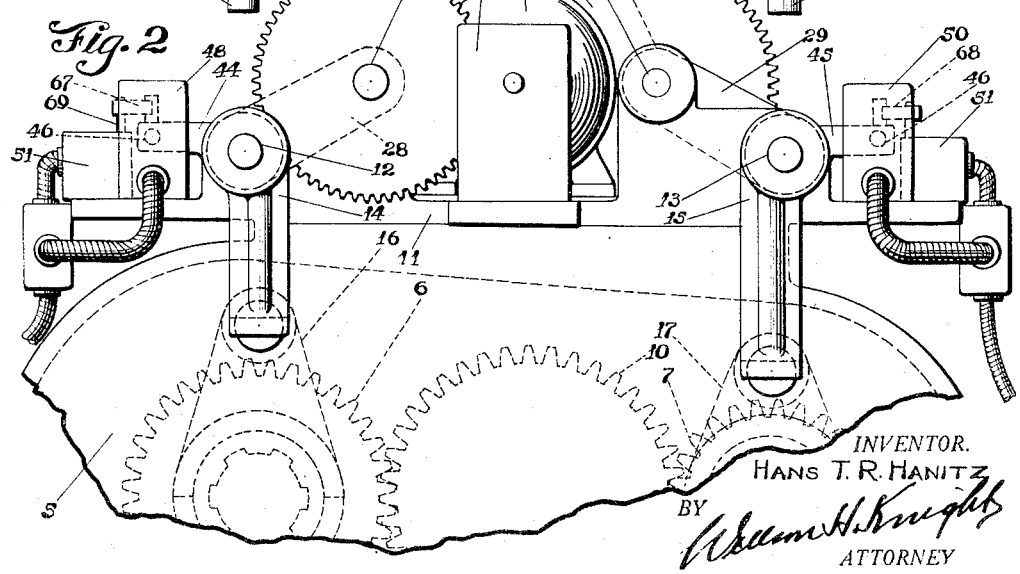
INVENTOR.
HANS T. R. HANITZ
BY
ATTORNEY

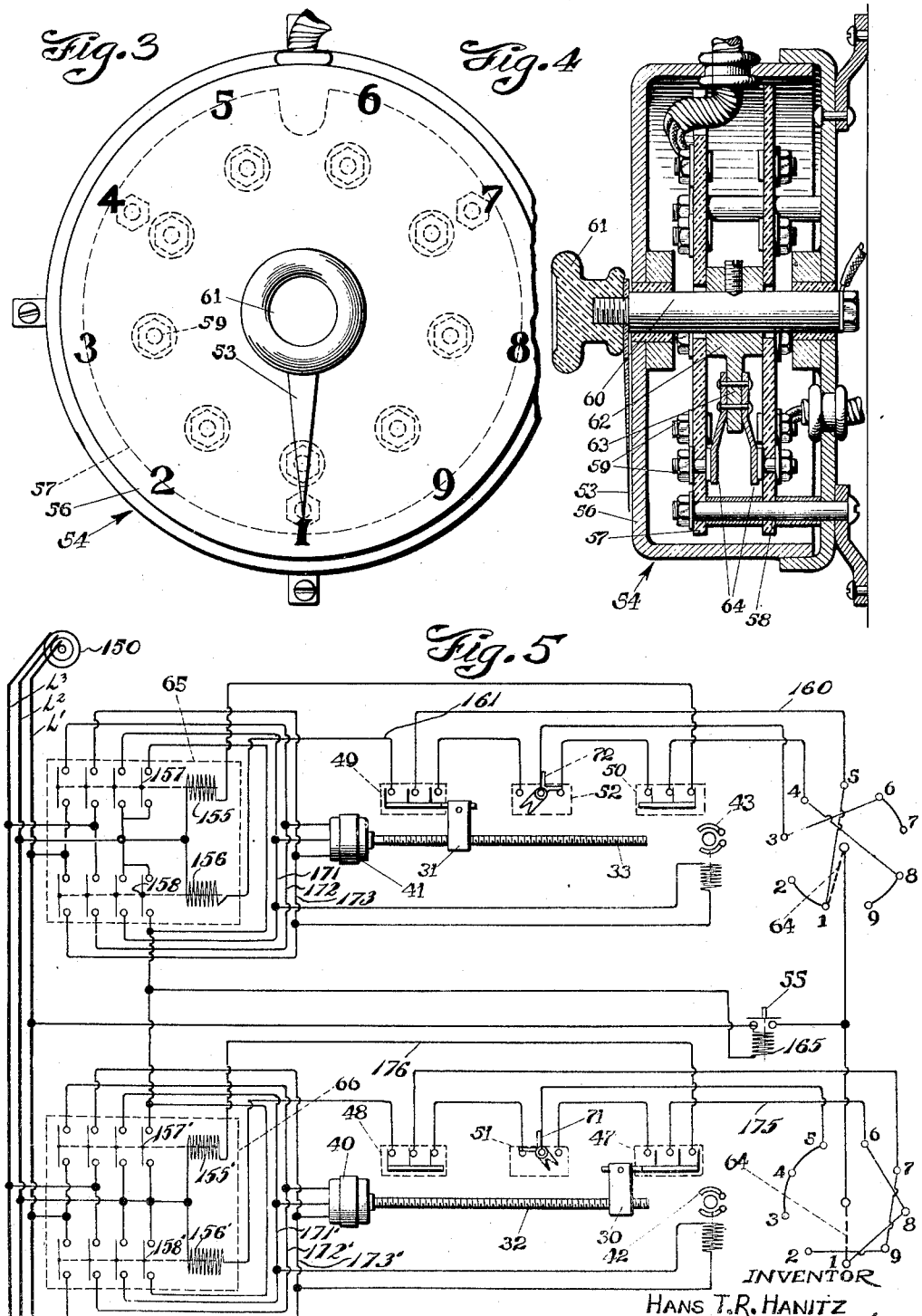

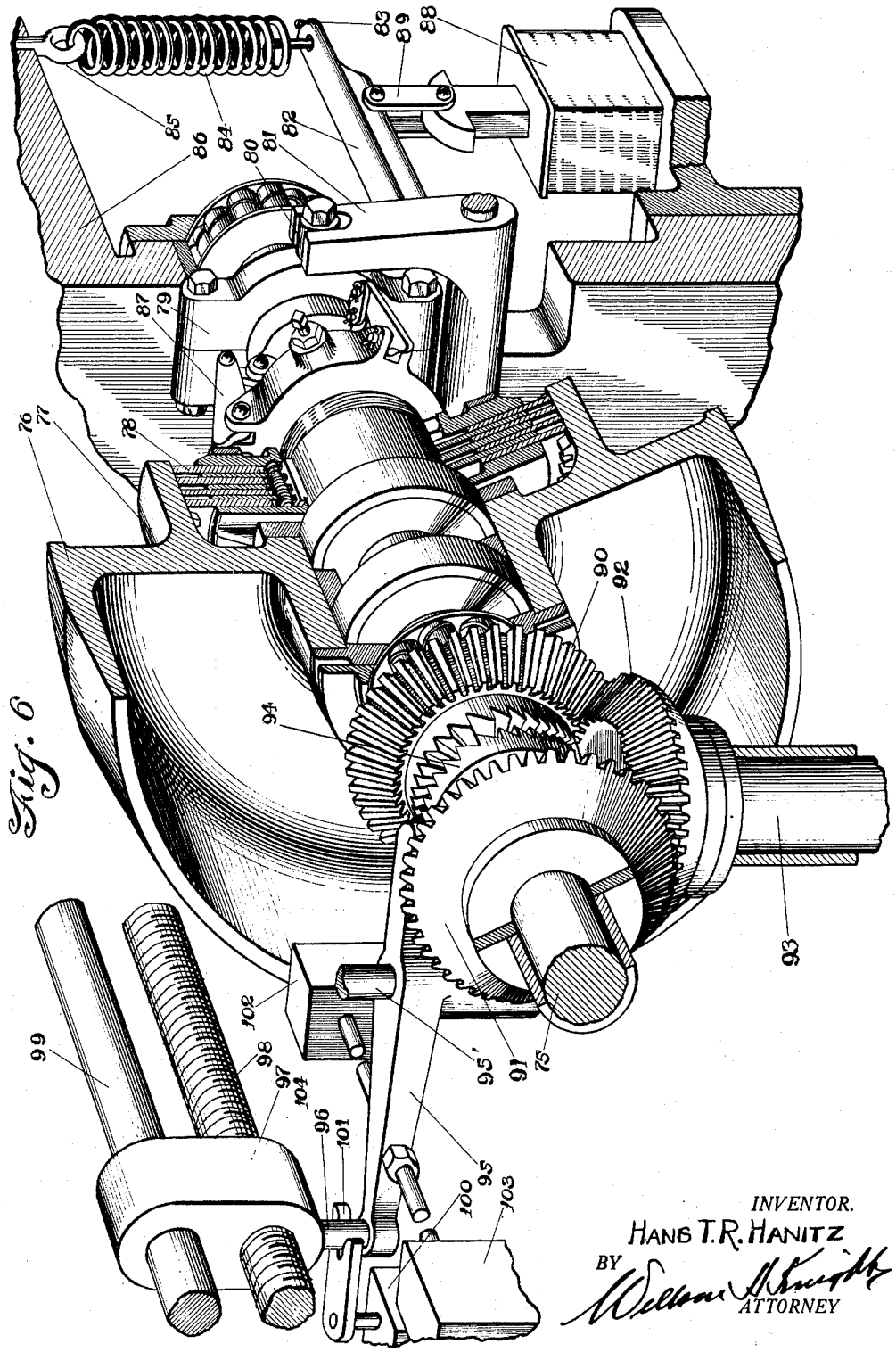

July 31, 1934.  H. T. R. HANITZ  1,968,520
CONTROL FOR CHANGE SPEED MECHANISMS
Filed Oct. 17, 1930   5 Sheets-Sheet 4
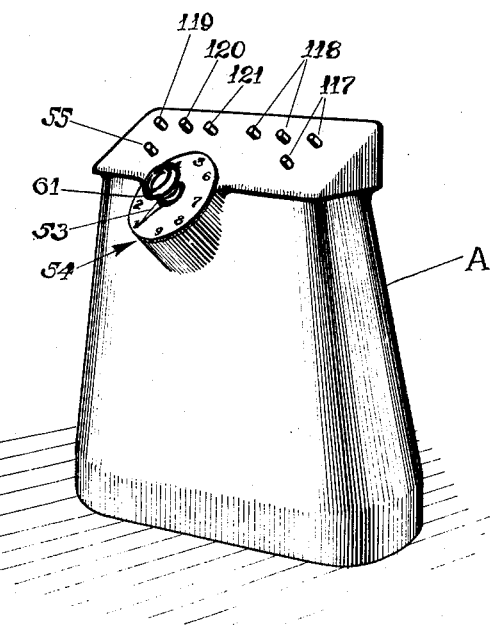
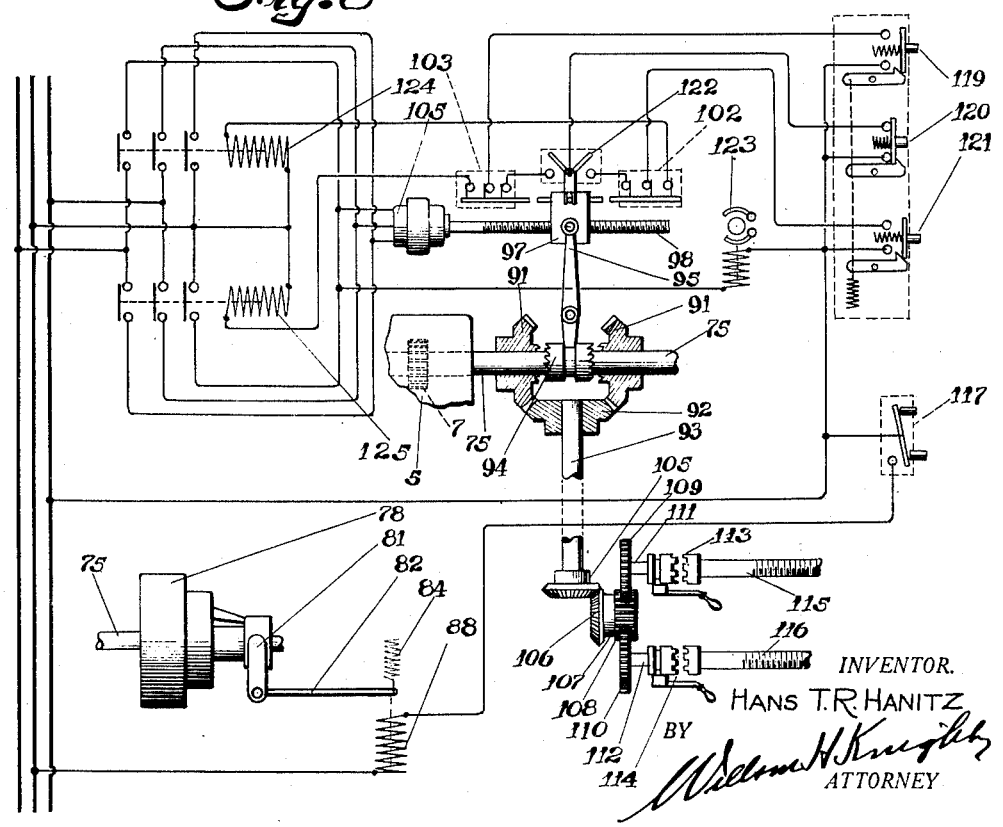
INVENTOR.
HANS T. R. HANITZ
BY
William H. Knight
ATTORNEY

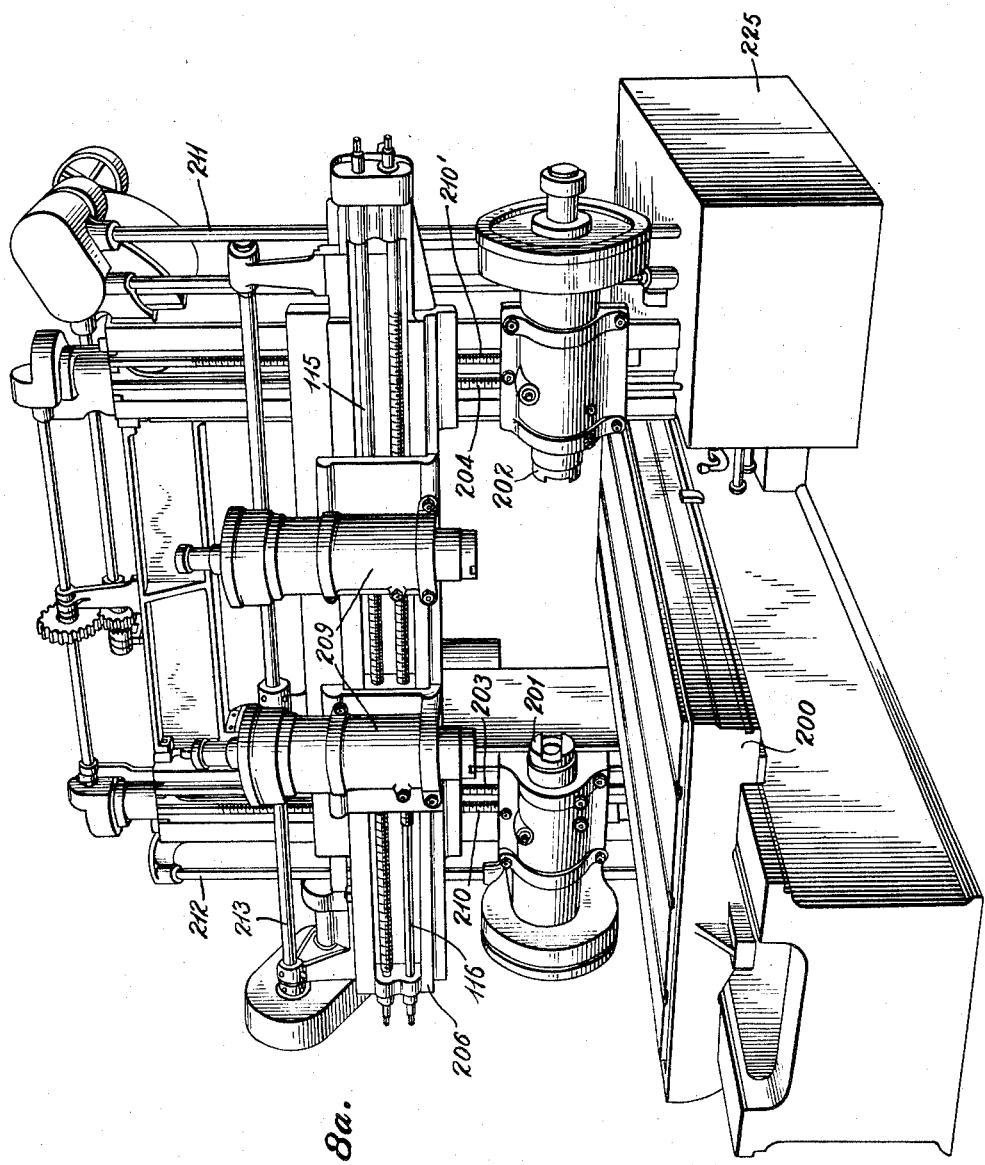

Patented July 31, 1934

1,968,520

UNITED STATES PATENT OFFICE 1,968,520

CONTROL FOR CHANGE SPEED MECHANISMS

Hans T. R. Hanitz, Rockford, Ill., assignor to The Ingersoll Milling Machine Company, Rockford, Ill., a corporation of Illinois Application October 17, 1930, Serial No. 489,258

13 Claims. (Cl. 90—18)

This invention relates in general to power transmissions and has particular reference to a centralized remote control which is especially applicable for use in controlling power transmissions for machine tools, such as mills of the heavy pattern planer type.

The primary object of the invention is to provide means whereby the speed and direction of the spindle drive, translation of the heads and clutch control in a mach.ne of the class above described can all be controlled from a central station with a minimum amount of effort on the part of the operator and without requiring any special operating skill. A machine of the type adapted to have my improvements incorporated therein is shown in the patent to Sears, No. 1,540,809, June 9, 1925.

Other objects of the invention will appear hereinafter the novel features and combinations being set forth in the appended claims.

One embodiment of the invention is presented herein for the purpose of illustration but it will, of course, be understood that the invention is susceptible to different modified embodiments which come equally within the scope of the appended claims.

In the accompanying drawings:

Fig. 1 is a view in plan of the gear shifting mechanism illustrating the application of the invention;

Fig. 2 is a view in end elevation of a gear shifting mechanism;

Fig. 3 is a face view of the speed selector part of the control;

Fig. 4 is a view in section of the speed selector;

Fig. 5 is a view of the wiring diagram of the electrical control for the mechanism shown in Fig. 1;

Fig. 6 is a perspective view with parts in section of a clutch and reverse mechanism which may be used in combination with the mechanism shown in Fig. 1;

Fig. 7 is a view in perspective of a centralized station for controlling the operation of the mechanism; and Fig. 8 is a view of the wiring diagram of the electrical control for the mechanism shown in Fig. 6.

Fig. 8a is a perspective view of a milling machine which is adapted for operation in accordance with the instant invention.

Referring now to the drawings in detail, 5, Fig. 1, represents a conventional type of gear box as used for obtaining as many as nine different spindle speeds for the cutters of milling machines of the heavy pattern planer type such as is shown in Fig. 8a. In this connection the gears 6 and 7 are splined on their respective shafts 8 and 9 (see Fig. 8 for shaft 9) so that they may be shifted into and out of mesh with the idler gears 10.

Heretofore this shifting of the gears has been accomplished only with manually operated levers with considerable operating burden and skillful manipulation.

The present invention reduces the operating burden to a minimum and makes it unnecessary to exercise any special skill in making the speed changes.

Mounted upon the gear box 5 is a base plate 11 which supports the shifting mechanism. This mechanism comprises a pair of spaced, parallel shifting rods 12 and 13 on which are mounted the depending arms 14 and 15. These arms carry forks 16 and 17 which are connected with the gears 6 and 7 in the usual manner. Mounted to slide on the rods 12 and 13 are sleeves 18 and 19 and the arms 14 and 15 are fixed to the undersides of these sleeves. The sleeves are each made to house a pair of oppositely acting springs 20 and 21 which are coiled around the rods 12 and 13 on opposite sides of the ring spacers 22 and 23. These spacers are fast on the rods so that as the rods are axially moved shifting motion will be transmitted to the arms 14 and 15 through the resiliency of the springs and thus the gears 6 and 7 will be eased into mesh with the idler gears. This will avoid clashing.

The rods are each mounted with freedom of axial sliding movement in a pair of fixed bearings 24 and 25 which are supported upon the plate 11. Fixed on the rods by collars 26 and 27 are the transverse connecting arms 28 and 29. These arms are fashioned with internally threaded nuts 30 and 31 which are threaded on the feed screws 32 and 33. The ends of the screws are journaled in two sets of bearings 34 and 35 positioned adjacent the bearings 24 and 25 and connected thereto by web members.

Mounted on one end of the feed screws are spur gears 36 and 37 which are in constant mesh with the drive pinions 38 and 39 on the shafts of the reversible motors 40 and 41. The motors are mounted end to end upon the pate 11 and their shafts are equipped with solenoid brakes 42 and 43.

With this construction it will be seen that operation of the motors will impart rotation to the screws and cause the nuts to feed along the screws carrying the rods with them and thus shift the gears through the depending arms 14 and 15.

The feed nuts each have three operating positions controlled by switches 47, 48, 49 and 50 for the end positions and switches 51 and 52 for the intermediate positions. The motors may operate collectively or selectively depending upon the combinations of position required to effect the desired speed changes. Each nut has three positions as above stated and since the nuts may be selectively positioned it will be possible to work out nine different positions. As an example, by causing the nut 30 to remain in the position shown in Fig. 1 the nut 31 may be moved into each of its three positions and each position of the nut 31 will develop a new gear combination. Furthermore, by moving the nut 30 into its intermediate position (see the dotted lines Fig. 1) the nut 31 may be moved through its three positions and this will work out a plurality of other gear combinations. By moving the nut 30 into its other end position still another set of gear combinations will be realized. It will make no difference which of the nuts are selected for the first move.

The positions of the nuts are determined by the switches above identified which open the circuit when the pins 46 come in contact with switch pins. This will be more fully described when the wiring diagram is described.

The different gear combinations are selected by moving the pointer 53 around the face of selector 54 into any one of nine circuit selecting positions as numbered in Fig. 3. After one of the nine different circuits has been thus selected the switch 55 will be used by the operator to close the circuit and operate the shifting mechanism.

The selector 54 comprises a box 56 for housing the supporting plates 57 and 58 for the nine double contacts 59. The central shaft 60 extends through the box to receive the hand knob 61. Mounted on the shaft 60 between the plates 57 and 58 is a collar 62 having a radial lug 63 which carries the double contact members 64. By turning the knob 61 the contact members 64 will be moved to bridge any pair of contacts selected.

Referring now to the circuit shown in Fig. 5 the motors 40 and 41 are reversed by the reverse switches 65 and 66. Switch 65 is connected with the stop switches 49 and 50 and the switch 66 is connected with the stop switches 47 and 48.

When the pointer of the selector is moved to bridge the double contact in No. 1 position the circuit to the two end switches 47 and 49 will be selected. Now when the switch 55 is closed by the operator this particular selected circuit will be closed thus starting both motors and moving the nuts 30 and 31 into a position shown in Figs. 1 and 5 whereupon the pins 46 will operate to open the switches 47 and 49 breaking the circuit with a result that the mechanism comes to rest in this position.

The details of the electrical circuit may be followed by reference to Fig. 5. A conventional source of three phase alternating current power is schematically shown at 150. The three lines of this distribution system which is economically available in the plant is tapped at suitable points for the energization of the various control circuits. Thus for the above setting at No. 1 position which is shown in completed position in Fig. 5, the closing of switch 55 completes a circuit for the upper system from line $L_1$ through switch 64, connector between 1 and 5, conductor 160, through middle and left contacts of switch 49, conductor 161, coil 156 and line $L_2$. It must be remembered that switch 49 is closed when button 55 is depressed. This circuit across coil 156 energizes the same, and bridges the power source with the motor lines by integral switch 158. A similar circuit may be traced for the lower system from line $L_1$, switch 64, connectors through 8 and 6, conductor 175, middle and right contacts of switch 47, conductor 176, coil 155' and line $L_2$. Aside from energizing the motor which effects a rotation of feed screws until their circuits are broken at the switches, 49 and 47, a holding circuit for button 55 is provided from line $L_1$, through coil 165 and the fourth switch of the internal switch systems 157, 157', 158 and 158' to line $L_2$. The direction of rotation of the motor 40 is the reverse of that of motor 41 since although the third switch from the left connects the same power line to the motor, line $L_2$ to lead 171, the two switches on the left reverse the phase across lines $L_1$ and $L_3$ to leads 172 and 173. Thus the alternate energization of coils 155, 156 and 155', 156' respectively, effect a reversal of rotation of the motors 41 and 40.

The energization circuits may be similarly followed for each position of the circuit selector. It will be found that the following settings will give the final positions of the feed nuts at the respective switches.

|  | Nut 31 | Nut 30 |
| --- | --- | --- |
|  | At switches | |
| Position 1 | 49 | 47 |
| 2 | 49 | 48 |
| 3 | 52 | 51 |
| 4 | 50 | 51 |
| 5 | 49 | 51 |
| 6 | 52 | 47 |
| 7 | 52 | 48 |
| 8 | 50 | 47 |
| 9 | 50 | 48 |

If another gear combination is required the pointer will now be moved to the position desired. Considering No. 2 position to be desired the pointer will be moved to No. 2 position and the circuit to switches 48 and 49 will be selected. Since the nut 31 is already in position to cause switch 49 to be held open closing the switch 55 will not close the circuit to the motor 41. The circuit to the motor 40 will be closed however and the nut 30 will be moved until the switch 48 is operated and the circuit thus opened.

When the nut passes one of the intermediate switches and swings the finger thereof around it reverses the circuit for its respective motor.

The intermediate switches 51 and 52 are peculiarly constructed so that the feed nuts may be caused to either stop opposite them or continue past to their end positions.

For this reason the switches are equipped with forked fingers 67 and 68. These fingers are pivoted as at 69 and 70 and the pivots carry right angle bridge members 71 and 72 to bridge one or the other end posts on the switches. If an intermediate position is desired for both nuts the pointer on the selector is moved on to No. 3 position. Now when the starter switch 55 is closed both motors will start and when the pins 73 and 74 on the lug extensions 44 engage the forks of the fingers the right angle bridge members will be rocked away from the end posts of the switches breaking the circuit and stopping the motors.

If it is desired to stop the nut 31 in an intermediate position and stop the nut 30 in an end position No. 7 position on the selector will be selected.

Whenever the nuts pass the intermediate switches they swing the bridge members from one end post to another but unless an intermediate position has been selected the switches are in an open circuit and it therefore does not break the selected circuit to the motor or motors as the case may be.

When using the above described mechanism the operator will manually control the clutch throw out when changing gear ratios. This manual operation of the clutch may be eliminated by using the mechanism shown in Fig. 6 in combination with the mechanism shown in Fig. 1. When this is required the drive shaft 75 is coupled with the shaft on which the spur gear 7 is splined. With this additional equipment it will be possible for the operator to stand at the remote control station A (see Fig. 7) and with the use of the selector and the switches change gears, throw out the clutch, control the translation of the tool head or heads, reverse the motor drive or in other words control the machine with minimum manual effort. Such a control is highly desirable not only in relieving the operator of the burden but it will also enable those not so skilled to operate a machine with excellent results.

A milling machine of the heavy pattern planer type which is adapted for the remote control of its several elements is illustrated in Fig. 8a. The reciprocating table 200 is designed to carry the work piece for the operation thereon by suitable cutting tools mounted in horizontally disposed tool spindles 201 and 202, mounted in heads which are vertically adjustable by the rotation of screws 203 and 204, respectively. Upon a cross rail 206, are mounted vertically disposed tool heads 209 which may be shifted relatively to each other by means of feed screws 115 and 116. The cross rail 206 may be raised or lowered by the rotation of screw shafts 210, 210'. The various tool spindles are driven through shafts 211, 212, and 213 by means of suitable transmission mechanisms at a speed determined by the electrically controlled gear shifting mechanisms, which may be disposed in drive box 225 adjacent the machine.

Referring now to Fig. 6 the shaft 75 serves to bring both the drive for the tool spindles and the power for translating the tool heads into the mechanism. For this purpose a driving pulley 76 is mounted with freedom of rotation on the shaft 75 and has a bell housing 77 on one side for housing the friction clutch 78. The clutch throw out 79 is made with trunnions 80 at diametrical sides. All of this mechanism is of conventional construction but instead of connecting the yoked hand control with the clutch throw out the present invention contemplates a fork 81 on which is mounted an arm 82. The end of the arm is equipped for connecting one end 83 of a coil spring 84 with the opposite end of the spring connected as at 85 to an anchorage in the casting 86. The spring thus pulling up on the end of the arm will rock the fork 81 and hold the clutch in through means of the pressure exerted by the thrust members 87. When the solenoid 88 is energized its link connection 89 with the arm 82 will pull down on the arm against the resistance of the spring 84 and throw the clutch out. Just as soon as the solenoid is de-energized the spring 84 will take command and again throw the clutch in holding it in until the solenoid throws it out. Mounted on the shaft 75 in advance of the clutch is a pair of spaced bevel gears 90 and 91. Meshing with these gears is a bevel gear 92 on the end of the shaft 93. The hubs of the bevel gears 90 and 91 are made with jaw teeth. Splined with limited sliding movement on the shaft 75 between the gears 90 and 91 is a sleeve 94 having jaw teeth at its opposite ends made to alternately mesh with the jaw teeth on the hubs of the gears 90 and 91 or else assume a neutral position out of mesh. This gear cluster and clutch equipment is also of conventional construction but instead of using a manual control for the clutch sleeve 94 as is customary a forked arm 95 engages the sleeve 94 with its opposite end terminating with an upstanding pin 96 which is embedded in the nut 97 threaded on the feed screw 98. The nut 97 is also slidably mounted on a guide rod 99. Mounted adjacent the end of the arm 95 is a switch 100 similar to the switches 51 and 52 in Fig. 1. This switch 100 is operated through means of a forked finger 101 in which the pin 96 is received. Stop switches 102 and 103 are also mounted on opposite sides of the arm 95 and the same are alternately operated by the transverse pin extending through the arm. By referring to the diagram of Fig. 8 it will be seen that the end of the feed screw 98 is coupled to a shaft of a motor 135 therefore when the motor rotates in one direction the nut 97 on the feed screw 98 will be fed forward and when the motor is reversed will be fed backwards.

The purpose of the above described jaw clutch arrangement is to translate the horizontal and vertical heads of a planer type milling machine. For this reason the shaft 93 is equipped with a bevel gear 105 which meshes with a companion gear 106 on a stub shaft 107. Mounted on the end of the shaft 107 is a gear 108 which is in constant mesh with the gears 109 and 110 on the ends of the shafts 111 and 112. These shafts 111 and 112 are equipped with jaw clutches 113 and 114 so as to operate either the feed screw 115 or the feed screw 116. The two vertical tool heads each have an operating feed screw for translating them, a nut in each head being threaded on their respective feed screws. Now with the power coming in on the shaft 93, as the clutch 113 is thrown in, the head connected with the feed screw 115 will be translated. The other clutch controls the other head. The direction in which they will be translated will depend on the direction in which the power is brought in on the shaft 93. The same arrangement is provided for translating the horizontal heads of the machine, in other words, each of the horizontal heads is equipped with a separate feed screw 203, 204 the same as the vertical heads.

Referring now to the diagram in Fig. 8, attention is called to the two-button switch 117. Pressing one of the buttons of this switch, the lower one as shown in Fig. 8 will close the circuit to the solenoid 78 and throw out the clutch. Then by moving the pointer 53 of the selector to the circuit desired the operator may choose the gear ratio and after making the circuit required pressing the button of switch 55 will throw the mechanism shown in Fig. 1 into motion and the gears will be shifted.

As soon as the shift has been made the opposite button on the switch 117 is pressed to open the clutch circuit de-energizing the solenoid 78 and thus permitting the spring 84 to throw the clutch in, whereupon the drive will be transmitted through the mechanism.

In order to reverse the direction of drive of the tool spindles the motor which drives them is reversed by the two-button switch 118. As previously stated the drive from this motor is taken into this mechanism through the drive pulley 76.

For controlling the translation of the heads three switches 119, 120 and 121 are provided. These three switches control the circuit to the stop switches 102 and 103 on opposite sides of the arm 95 and the intermediate switch 100. When the drive to the shaft 93 is interrupted the clutch sleeve 94 will, of course, be in neutral in which event the switch 120 will be closed and as shown in Fig. 8 the bridge member 122 leaves the circuit between the two end positions open. When it is desired to throw the clutch sleeve 94 into engagement with the bevel gear 91 switch 121 will be closed by the operator and this will start the motor 105 to move the feed nut 97 in the direction of the stop switch 102 and in doing so rocking the arm 95 and sliding the sleeve 94 toward the gear 91. When it is desired to reverse the direction of the shaft 93 the switch 119 will be closed which will start the motor 105 and move the nut 97 in the direction of the stop switch 103. The motor 105 is equipped with a brake 123 and the reverse switch for the motor is shown as at 124 and 125.

The stop switches 47, 48, 49, 50, 51 and 52 as well as the switches 100, 102 and 103 are of conventional types known to the trade as momentary contact switches the same being illustrated on page 31 of Catalogue U, copyright 1929 by Hart and Hageman Division of the Arrow-Hart and Hageman Electric Company, Hartford, Connecticut.

Since the application of the invention is of special utility in connection with the control of spindle drives for machine tools such as mills of the heavy pattern planer type, this particular embodiment has been selected to explain its many advantages. It will be understood, however, that this particular use is not necessarily the limit of its practical application. In this connection mention will be made of the possibility of using the same control for the table feed of a milling machine of this character or in fact on any other table feed where a change speed and reverse is required.

Having thus described and shown an embodiment of this invention what I claim and desire to secure by Letters Patent of the United States is:

1. In the combination of a metal working machine having a translatable head with a rotary spindle therein, a drive for said spindle, electrically controlled actuating means for changing the speed of the spindle drive, electrically controlled actuating means for translating the head, and a common control station for both of said actuating means.

2. In the combination of a metal working machine having a translatable head with a rotary spindle therein, a drive for said spindle, electrically controlled actuating means for changing the speed of the spindle drive, electrically controlled actuating means for translating the head, a common control station for both of said actuating means, a common driving member for the operation of the spindle and the translation of the head, and a clutch, electrically controlled from said common control station, adapted to disengage said driving member from the spindle and head.

3. In the combination of a metal working machine having a spindle drive, driving means therefor, a change speed mechanism comprising a shiftable gear, means for adjusting the position of said gear, an electric control means therefor, a clutch for disconnecting the driving means from the change speed mechanism, an electric control means for said clutch, and a common station for both of said electric control means.

4. In the combination of a metal working machine, a change speed mechanism comprising a shiftable gear, control means for shifting the position of said gear comprising a feed screw, a feed nut threaded on said screw, connections between said shiftable gear and said nut, a reversible multi-phase alternating current motor for rotating said screw to shift the position of said nut, a circuit selector for said motor, a lateral extension on said nut, a contact switch in the path of said extension at predetermined limits of its travel adapted to interrupt the energizing circuit of said motor and enabling only a reversal or a continued deenergization of the motor at a successive setting of the circuit selector.

5. In the combination of a metal working machine, a change speed mechanism comprising a shiftable gear, control means for shifting the position of said gear comprising a feed screw, a feed nut threaded on said screw, connections between said shiftable gear and said nut, a reversible multiphase alternating current motor for rotating said screw to shift the position of said nut, a circuit selector for said motor, a lateral extension on said nut, contact switches comprising an arresting contact switch in the path of said extension at the terminals and at an intermediate point of the path of travel of said nut, said circuit selector cooperating with said contact switches and said extension to break the energizing circuit of said motor when said nut arrives at a predetermined point of its travel as set upon the circuit selector, the arresting contact switch being adapted to aid in the control of the subsequent action of said motor at the following setting of the circuit selector.

6. In the combination of a metal working machine, a change speed mechanism comprising a plurality of shiftable gears, control means for shifting said gears from one to another of a plurality of positions, comprising a pair of parallel feed screws, a feed nut threaded on each screw, gear shifting connections between said gears and said nuts, a reversible electric motor for driving each screw in opposite directions of feed, and means for controlling each of said motors, comprising a plurality of motor circuits, a circuit selector, a manually operated switch common to all of said circuits for starting the motor and means operable automatically for opening the selected circuit at a predetermined stage in the feed movement of one or both of said nuts.

7. In the combination of a metal working machine, a change speed gearing comprising a drive shaft, an idler shaft, a driven shaft, sliding gears on said driving and driven shafts adapted to be selectively shifted into mesh with a plurality of gears on said idler shaft and control means for shifting said gears, comprising a pair of feed screws, a feed nut threaded on each screw, gear shifting connections between said gears and said nuts, a reversible electric motor for driving each of said feed screws in opposite directions of feed to feed the nuts along the same, and means for controlling said motors, comprising a plurality of motor circuits, a circuit selector, a manually operable switch common to all of said circuits for starting one or both of the motors, and a plurality of stop switches operable automatically for opening the selected circuit at a predetermined stage in the feed movements of one or both of the nuts.

8. In the combination of a metal working machine, a change speed mechanism, a shiftable gear, and control means for shifting the position of said gear comprising a motor driven feed screw, a feed nut threaded on said screw, a shifting rod connected to said nut, an actuating member connected to said gear, and a resilient body mounted intermediate said rod and said actuating member.

9. In the combination of a metal working machine having a translatable head, driving means for translating said head, a reversible clutch associated with said driving means comprising a driving shaft, a sleeve having engaging teeth upon each end shiftably mounted upon said shaft, bevel gears having cooperating teeth loosely mounted on said shaft upon each side of said sleeve, a driven shaft, a bevel gear fixed to said driven shaft in engagement with said first mentioned bevel gears at opposite sides thereof, and electrically controlled means for selectively positioning said sleeve intermediately or in engagement with one of said loosely mounted bevel gears to control the actuation of said driven shaft.

10. The combination claimed in claim 9 wherein said last mentioned means comprises a multi-phase reversible alternating current motor, a feed screw driven by said motor, a feed nut threaded on said screw, a connecting member between said nut and said sleeve, a lateral extension on said nut, and contact switches in the path of said extension at predetermined limits of its travel adapted to interrupt the energizing circuit of said motor.

11. In a machine of the class described, a reciprocable member, a tool spindle in said machine, driving means for said tool spindle, electrically controlled actuating means for changing the speed of said driving means, electrically controlled actuating means for reciprocating said member, and a common control station for both of said actuating means.

12. In a machine of the class described, a reciprocable member, a tool spindle in said machine, driving means for said tool spindle, electrically controlled actuating means for changing the speed of said driving means, electrically controlled actuating means for reciprocating said member, a common control station for both of said actuating means, a common driving member for the operation of the spindle and the reciprocation of said member, and a clutch electrically controlled from said common control station adapted to disengage said driving member from the spindle and reciprocating member.

13. In a machine of the class described, a reciprocable member, driving means for reciprocating said member, an adjustable clutch associated with said driving means comprising a driving shaft, a sleeve having engaging teeth upon each end shiftably mounted upon said shaft, bevel gears having cooperating teeth loosely mounted on said shaft upon each side of said sleeve, a driven shaft, a bevel gear fixed to said driven shaft in engagement with said first mentioned bevel gears at opposite sides thereof, and electrically controlled means for selectively positioning said sleeve intermediately or in engagement with one of said loosely mounted bevel gears to control the actuation of said driven shaft.

HANS T. R. HANITZ.